L. B. RICHMOND, H. S. HOLMES & L. R. PECK.
MACHINE FOR MAKING TILE.
APPLICATION FILED FEB. 25, 1910.
998,637.
Patented July 25, 1911.
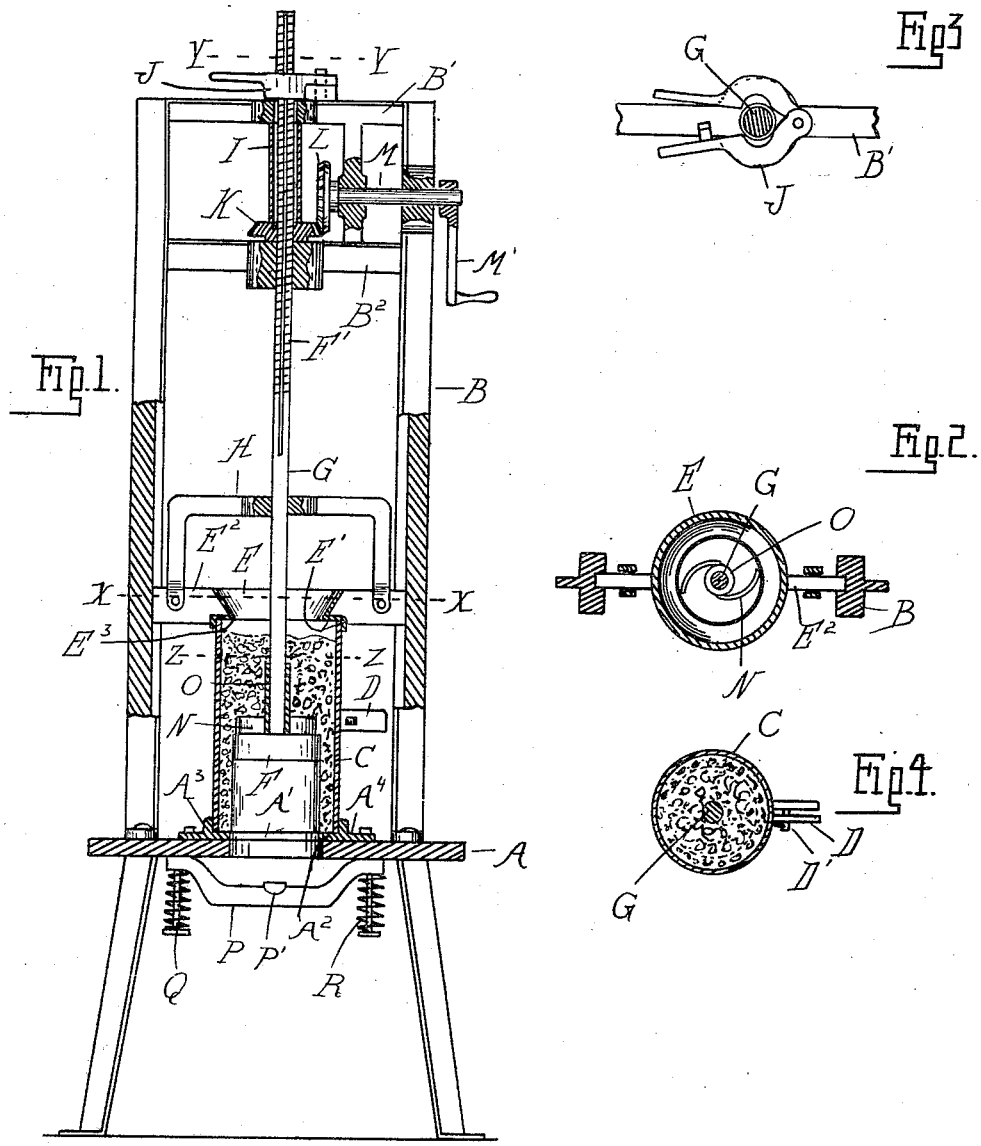
Witnesses
W. B. Ford
J. H. Belknap
Inventors
Lewis. B. Richmond
Horace. S. Holmes
Luke. R. Peck
By Whittemore Hulbert & Whittemore
Attys

UNITED STATES PATENT OFFICE.

LEWIS B. RICHMOND, HORACE S. HOLMES, AND LUKE R. PECK, OF ST. JOHNS, MICHIGAN.

MACHINE FOR MAKING TILE.

998,637.  Specification of Letters Patent.  Patented July 25, 1911.

Application filed February 25, 1910. Serial No. 545,829.

*To all whom it may concern:*

Be it known that we, LEWIS B. RICHMOND, HORACE S. HOLMES, and LUKE R. PECK, all citizens of the United States of America, residing at St. Johns, in the county of Clinton and State of Michigan, have invented certain new and useful Improvements in Machines for Making Tile, of which the following is a specification, reference being had therein to the accompanying drawings.

The invention relates to machines for manufacturing tile and more particularly designed for use in the manufacture of tile from sand and cement.

The invention consists in the means employed for compacting and molding the plastic material; further, in the means for automatically lifting the hopper to permit of detachment of the mold at the completion of the molding operation; further, in the means for quickly restoring the parts for a succeeding operation; and, further, in various features of construction as hereinafter set forth.

In the drawings—Figure 1 is a vertical central section, partly in elevation through the machine; Fig. 2 is a horizontal section on line X—X, Fig. 1; Fig. 3 is a section on line Y—Y, Fig. 1; and Fig. 4 is a section on line Z—Z.

A is a suitable stand or support upon which is mounted an upright frame B preferably consisting of parallel side bars and a plurality of connecting cross bars B' B².

C is a cylindrical mold provided with arms D for the opening of the same, and having a locking latch D' for holding the mold normally closed. The mold C rests centrally upon a detachable holder plate A⁴ upon the table or stand A, said plate being provided with an opening A' of lesser diameter than the mold, making an inwardly-projecting flange A² and a surrounding guide flange A³ which centers the mold. At the top of the mold is a hopper E which is provided with a flange E' for engaging the mold and oppositely-projecting arms E² which slidably engage guide bearings on the frame B.

F is a plunger or core for molding the inner face of the tile, which is carried by a vertically-extending rod or shank G. This shank slidably engages bearings in the arms B' and B² by which it is guided centrally in relation to the mold C. There is also a bearing for the shank in a bail H, which is secured to the arms E² of the hopper.

The core F is initially arranged at the bottom of the mold in the opening A' and during the molding operation is simultaneously revolved and moved upward through the mold. This operation is effected by threading the upper end of the shank at F' and providing a threaded nut or bearing J upon the upper cross arm B'. There is also a bevel gear wheel K, which is feathered upon the shank G above the cross arm B², said wheel being held from longitudinal movement by a sleeve I upon the shank thereabove extending to the upper cross bar B'.

L is a coöperating bevel gear wheel upon a crank shaft M journaled in bearings on the frame and provided with an operating crank M'. Thus by rotating the crank M' rotary motion is communicated to the shank and plunger, while the threaded engagement of the shank with the nut J causes its upward movement, thereby elevating the plunger within the mold.

The plunger F is provided with a cylindrical portion, which is of the size of the internal diameter of the mold and tile, and of the aperture A' in the holder A⁴. Above this cylindrical portion are deflector wings N, which during the rotation of the plunger will force the plastic material from the center toward the periphery of the mold. There is also a sleeve O upon the shank extending upward from the plunger and forming a bearing which, as the plunger reaches the upper end of the mold, will engage with the bail H, lifting the hopper to disengage the same from the mold. The base of the hopper has a flat annular portion E³, the opening through which is equal to the diameter of the plunger, said annular portion forming a top molding rim for retaining the plastic material.

The nut J, which engages the threaded portion of the shank, is preferably formed of separable sections, so that by opening these sections the shank and plunger may be permitted to drop without the necessity of screwing the same downward by the rotation of the crank M'. Beneath the bed A is a bearing P for receiving the impact of the plunger and for supporting the latter in proper position at the beginning of the molding operation. This bearing P is in the form of a cross head slidably engaging vertical guides Q and yieldably held in position by springs R. At the center of the cross head is a bearing P' for receiving the impact of the plunger.

In the operation of the machine, the mold is first placed upon the holding plate, the hopper E is then engaged with the upper end of the mold and the nut J is opened to permit the downward movement of the plunger and shank until the former rests upon the bearings P. In this position it will fill the opening A', completing the bottom of the mold. The plastic material is then filled into the hopper and passes downward into the mold. Motion is imparted to the plunger by the rotation of the crank M' which through the shaft M, bevel gear wheels L and K revolves the plunger, while the nut J causes the gradual rising of the same, forcing it upward through the plastic material in the mold. During this movement, the rotation of the curved wings N will force the crimped material outward from the center of the mold toward the periphery thereby clearing a path for the upward movement of the plunger, and also compacting the material against the sides of the mold, this operation continuing until the upper end of the mold is reached. Just before the completion of the upper movement of the plunger, the sleeve O will engage the bail H, lifting the same and the hopper E, thereby completely freeing the mold, and permitting it to be lifted from the holding plate and replaced by another mold. It will be observed that in this operation the annular portion $A^2$ in the bottom of the mold forms a molding face for the lower end of the tile, and the annular portion $E^3$ upon the hopper correspondingly molds the upper end of the tile. These flanges prevent ragged edges at the end of the mold body.

The purpose of making the holding plate $A^4$ detachable is to permit of exchanging plates to fit molds of varying size. Thus where a larger or smaller mold is used, the plate $A^4$ is detached and a plate of suitable size substituted.

What we claim as our invention is:

1. In a machine for forming hollow bodies of plastic material, the combination with a mold, a plunger, means raising the plunger through the mold, means for permitting the return of the plunger by gravity, and a cushioned bearing at the lower end of said mold for receiving the impact of the plunger.

2. In a machine for forming hollow bodies of plastic material, the combination of a mold, a plunger, means for raising the plunger through the mold, means permitting the return of the plunger by gravity, a supporting base for the mold apertured for the passage of the plunger, and a spring support bearing beneath said base for receiving the impact of the plunger.

3. In a machine for forming hollow bodies, of plastic material, the combination with a mold, a supporting bed therefor, having a central aperture of lesser diameter than the mold leaving an annular flange, a hopper detachably engaging the upper end of said mold, having a corresponding aperture, an annular flange, a plunger for fitting said apertures in the hopper and base, and means for raising the plunger through the mold from a position in engagement with the aperture in the bed to a position in engagement with the aperture in the hopper.

4. In a machine for forming hollow bodies of plastic material, the combination with a mold, of a bed on which said mold is supported having an aperture therein of lesser diameter than the mold, a hopper detachably engaging the upper end of said mold and having a corresponding aperture, a plunger for fitting said apertures, means for receiving said plunger through the mold and simultaneously rotating the same, a deflector in advance of said plunger rotating therethrough for forcing the plastic material radially outward against the sides of the mold, and means for engaging said hopper by said plunger at the completion of its upward movement to lift and disengage the hopper from the mold.

5. In a machine for forming hollow bodies of plastic material, the combination of a supporting bed, an upright frame thereon, a mold supported on said bed, a plunger, a shank for said plunger extending upward and slidably and rotatably engaging bearings on said frame, means for rotating and simultaneously raising said shank detachably seated on the upper end of said frame, a bearing on said hopper slidably engaging a guide on said frame, and means on said plunger for engaging said hopper to lift and disengage the same from said mold.

6. In a machine for molding hollow bodies of plastic material, the combination of a bed, an upright frame thereon, a mold supported on said bed, a hopper detachably engaging the upper end of said mold, a bearing on said hopper slidably engaging a guide on said frame, a plunger, a shank for said plunger, bearings on said frame for alining said shank and plunger axially with said mold, means for rotating and longitudinally moving said shank and plunger, and a bearing on said hopper engaging said shank forming a guide for the latter, and means for disengaging the hopper from the mold.

7. In a machine for molding hollow bodies of plastic material, the combination of a base, an upright frame thereon, a mold supported on said base, a guide bearing on said base for positioning said mold, a hopper slidably engaging said frame in alinement with the bearing on said base and having a plunger for engaging the upper end of said mold, a plunger movable axially through said mold, a shank for raising said plunger, bearings on said frame for said shank, means for raising and rotating said shank, and a bearing on said hopper engaging said shank for guiding the latter and for lifting said hopper from engagement with the mold.

8. In a machine for forming hollow bodies of plastic material, the combination with an apertured supporting base, an upright frame thereon, a mold resting upon said base, a guide bearing for positioning said mold on said base concentric with said aperture with an annular portion within the mold surrounding the aperture, a hopper slidably engaging said frame and detachably engaging the upper end of said mold having an aperture alined with the aperture in said base and of corresponding size, a plunger fitting the apertures in said hopper and base, a shank for raising and rotating said plunger guided in bearings on said frame in alinement with the apertures in said hopper and base, and means for simultaneously rotating and raising said shank.

9. A machine for forming hollow bodies of plastic material, comprising a bed, exchangeable mold holding plates, detachably secured to said bed, a mold for each plate, a hopper detachably engaging the upper end of said mold, a plunger, means for raising said plunger axially through the mold, and means on said plunger for engaging said hopper to lift the same from said mold.

In testimony whereof we affix our signatures in presence of two witnesses.

LEWIS B. RICHMOND.
HORACE S. HOLMES.
LUKE R. PECK.

Witnesses:
  THOS. E. CORKIN,
  R. C. DEXTER.

---

Copies of this patent may be obtained for five cents each, by addressing the "Commissioner of Patents, Washington, D. C."